(12) United States Patent
Ruehle (10) Patent No.: US 7,024,511 B2
(45) Date of Patent: Apr. 4, 2006

(54) METHOD AND APPARATUS FOR ACTIVE MEMORY BUS PERIPHERAL CONTROL UTILIZING ADDRESS CALL SEQUENCING

(75) Inventor: Michael Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 09/888,105

(22) Filed: Jun. 22, 2001

(65) Prior Publication Data

US 2002/0199046 A1    Dec. 26, 2002

(51) Int. Cl.
*G06F 13/00* (2006.01)
(52) U.S. Cl. ...................................................... 710/316
(58) Field of Classification Search ................ 710/100, 710/162, 316; 713/162, 153
See application file for complete search history.

(56) References Cited

U.S. PATENT DOCUMENTS

| | | | | |
|---|---|---|---|---|
| 4,755,932 A | * | 7/1988 | Diedrich .................. 379/88.16 |
| 5,109,333 A | | 4/1992 | Kubota et al. .............. 395/275 |
| 5,237,616 A | | 8/1993 | Abraham et al. ............. 380/49 |
| 5,598,575 A | * | 1/1997 | Dent et al. ..................... 710/28 |
| 5,687,346 A | * | 11/1997 | Shinohara ................... 711/130 |
| 5,818,939 A | | 10/1998 | Davis ........................... 380/49 |
| 5,862,359 A | * | 1/1999 | Nozuyama .................. 710/316 |
| 5,878,240 A | * | 3/1999 | Tomko ....................... 710/316 |
| 5,960,190 A | * | 9/1999 | MacKenna ................... 703/28 |
| 5,999,654 A | * | 12/1999 | Toujima et al. ............. 382/232 |

OTHER PUBLICATIONS

Emeka Mosanya et al., "CryptoBooster: A Reconfigurable and Modular Cryptographic Coprocessor", Cryptographic Hardware and Embedded Systems, 1st International Workshop, 1999 proceedings, vol. 1717, Aug. 12, 1999, pp. 246-256.

* cited by examiner

*Primary Examiner*—Rehana Perveen
*Assistant Examiner*—Nimesh Patel
(74) *Attorney, Agent, or Firm*—Joni D. Stutman-Horn (57) ABSTRACT

A system and method for peripheral control. The present invention relates to utilizing device address call sequencing for control of active memory bus peripheral devices. To prevent problems inherent with triggering events in active memory bus peripherals, such as are associated with error correction means, and to minimize pin usage, a system and method are provided to utilize memory address call sequencing of other devices to trigger such events.

38 Claims, 6 Drawing Sheets

METHOD AND APPARATUS FOR ACTIVE MEMORY BUS PERIPHERAL CONTROL UTILIZING ADDRESS CALL SEQUENCING

BACKGROUND INFORMATION

The present invention relates to peripheral control. More specifically, the present invention relates to utilizing separate device address call sequencing for control of memory bus peripheral devices.

In a continuing quest for increased computer speed and efficiency, designers sometimes utilize purpose-specific devices to handle activities for which the devices can be specifically engineered. For example, video cards (graphics accelerators) are often utilized to improve a computer system's ability to display video images without sacrificing overall computer performance. They free up a computer's central processing unit (CPU) to execute other commands while the video card is handling graphics computations.

Another example has to do with purpose-specific devices for encryption and decryption. As more and more information is communicated via the Internet, security concerns have become increasingly prevalent. Encryption techniques are used in the art to prevent the unauthorized interception of data transferred across the Internet. An example of a common protocol for data encryption is the Security Sockets Layer (SSL) (SSL 2.0, revised Feb. 9, 1995). When an SSL session is initiated, the server forwards its 'public' key to the user's browser, which the browser uses to send a randomly-generated 'secret' key back to the server to have a secret key exchange for that session. Developed by Netscape™, SSL has been merged with other protocols and authentication methods by the Internet Engineering Task Force (IETF) into a new protocol known as Transport Layer Security (TLS) (TLS 1.0 revised 1999).

Encryption/decryption protocols, such as is used in SSL, are very computationally intensive. The process of encoding and decoding information can rob a great deal of a central processing unit's (CPU) valuable processing resources. In addition to encryption/decryption and video processing, other activities that involve computationally intensive and repetitive processes benefit from purpose-specific peripheral processing.

In providing a purpose-specific device on a memory bus (a memory bus peripheral), such as for encryption/decryption, the device needs to be active and further, be able to receive commands from the CPU. It is therefore desirable to have a system that relieves a CPU of a share of responsibility for computationally intensive activities by providing a dedicated, active memory bus peripheral. It is further desirable to have an improved communication system between the CPU and the dedicated, active memory bus peripheral.

DETAILED DESCRIPTION

Figure 1:
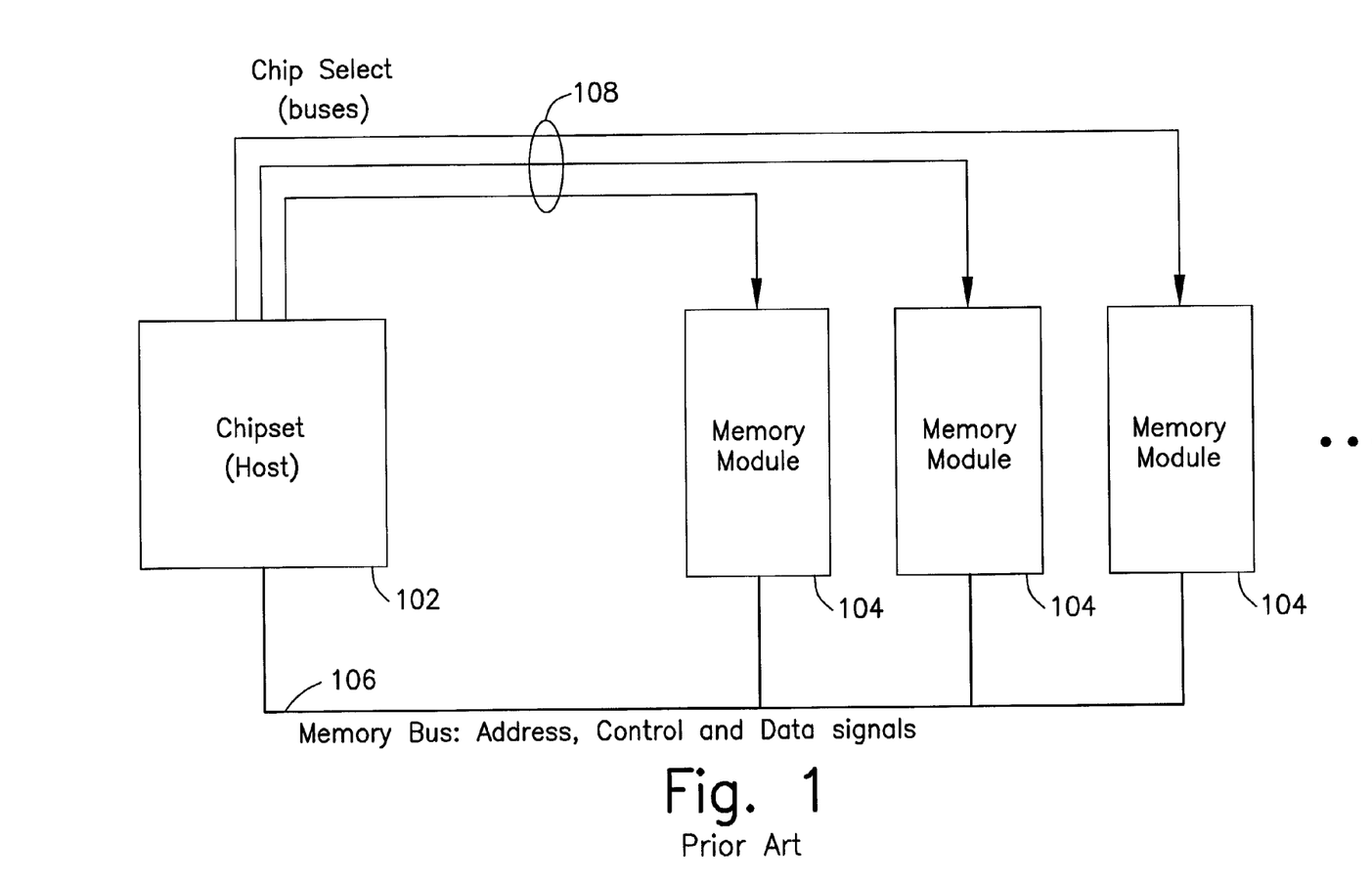
FIG. 1 provides an illustration of a typical memory bus in the art.

FIG. 1 provides an illustration of a typical memory bus in the art. A microprocessor chipset 102 (the host) utilizes one or more memory modules 104, e.g. Dual In-line Memory Modules (DIMM). The host 102 typically communicates with the memory modules via a common memory bus. In other words, each memory module sees all address, control, and data signals being communicated on the memory bus 106. The host is able to define which memory module is intended for receipt of a message through utilization of a series of 'chip select' lines (buses) 108. In FIG. 1, a series of chip select 'buses' 108 is provided. In a DIMM, for example, each chip select bus 108 would provide a chip select to the front of the module and one to the backside of the module. Each chip select line 108 is associated to a specific memory module 104. The chip select line 108 asserted provides which memory module is to receive the data currently communicated on the memory bus 106.

Figure 2:
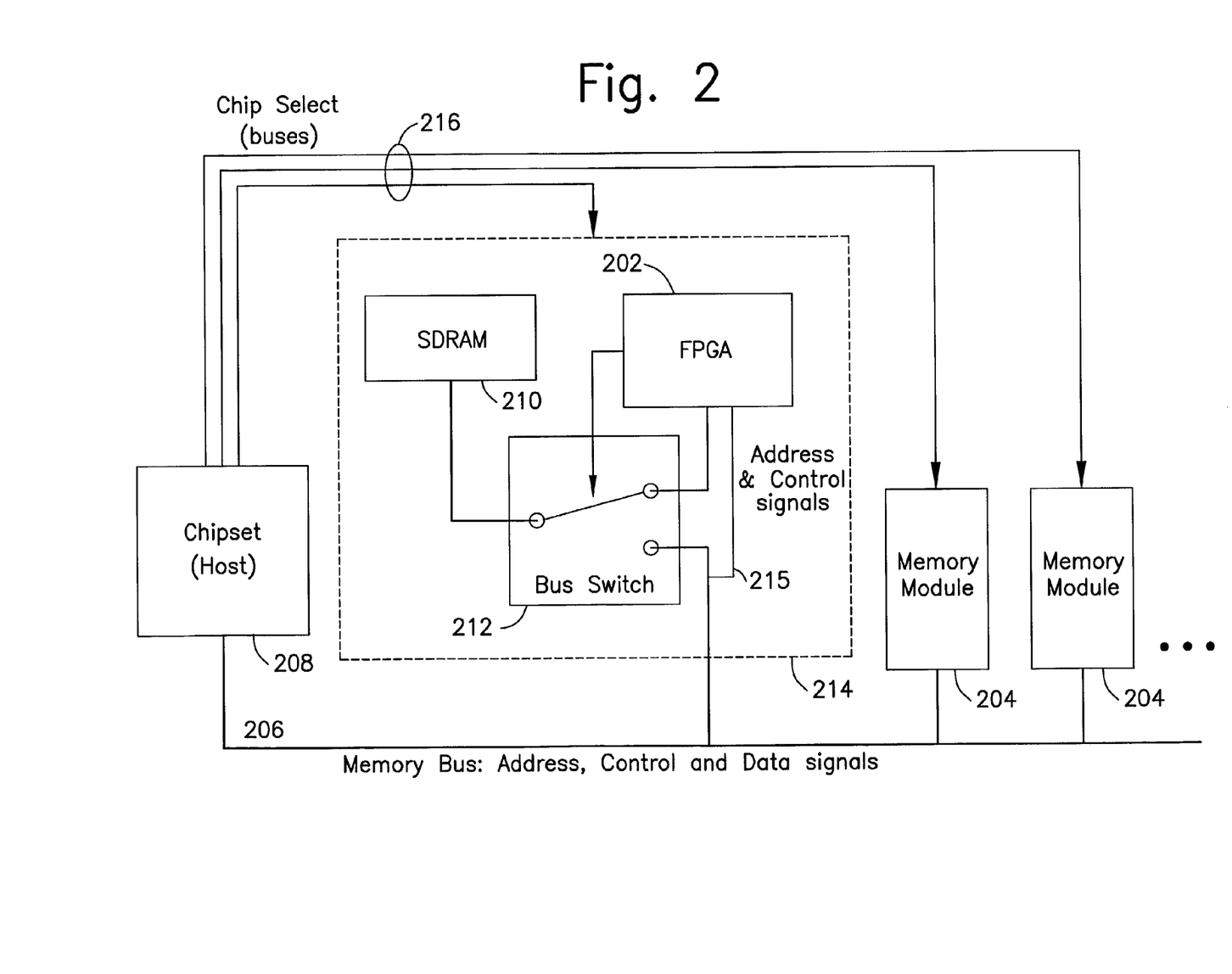
FIG. 2 illustrates the operation of an active memory bus peripheral under principles of the present invention.

FIG. 2 illustrates the operation of an active memory bus peripheral under principles of the present invention. In one embodiment of the present invention, a Field Programmable Gate Array 202 (FPGA), is utilized for accelerating various computationally intensive tasks (such as encryption and decryption). The FPGA 202 is configured for optimal performance of the repetitive computations associated with its purpose (encryption/decryption, etc.) through parallel processing units, etc. In one embodiment, the FPGA 202 is located in a DIMM slot on a PC-100 (Registered DIMM Design Specification (Revision 1.2)) or PC-133 (Registered DIMM Design Specification (Revision 1.1)) memory bus 206. In one embodiment, on-board SDRAM (Synchronous Dynamic Random Access Memory) 210 is shared between the host computer 208, which perceives it as normal memory (just another memory module 204), and the FPGA 202, by switching 212 the address/data/control connections to the on-board SDRAM 210 between the host 208 and the FPGA 202. In one embodiment, at any given time, either the host 208 or the FPGA 202 has access to the on-board SDRAM 210. Switching, by the bus switch 212, of this on-board SDRAM 210 bus is requested by the host machine 208 but controlled directly by the FPGA 202. In one embodiment, the host 208 must be able to send the FPGA 202 two commands: "Switch the SDRAM bus to the host" and "Switch the SDRAM bus to the FPGA." Using the host's perspective, these can be called 'Get Bus' and 'Put Bus,' respectively.

In one embodiment, a signal tap 215 is utilized to link the FPGA 202 to the address and control signals, as well as the apparatus' 214 chip select, on the host's memory bus 206, regardless of to which device the on-board SDRAM bus switch 212 is connected, so that it can monitor the values driven by the host 208. In one embodiment, due to size restrictions, the FPGA 202 does not have enough pins to monitor the data lines. Hence, the data signals are not monitored.

A potential means of sending the 'Get Bus' command is to have the host 208 read from or write to one of two respective trigger addresses in the on-board SDRAM's 210 memory. By monitoring address and control signals the FPGA 202 could detect when the trigger address for the 'Get Bus' command is accessed, and switch the bus accordingly. However, on systems employing Error Correction Code (ECC) memory, this could potentially cause a problem. When the host 208 issues a 'Get Bus' command, it is presumably not connected to the on-board SDRAM's 210 memory. If the chipset 208 attempts to read from the on-board SDRAM's 210 memory, it will read invalid data or 'garbage'—whatever values happen to lie on the memory bus's 206 data and parity lines as a result of previously driven values (capacitance and charge leakage)—and this may generate an ECC error, with possibly terminal consequences. The system may decide that the memory (the apparatus 214) is defective and shut down communication to it entirely. On some systems, even a write requested by the central processing unit (CPU) may generate a read by the chipset 208, e.g. the chipset 208 reads from several locations, modifies some of the data as requested, then writes it all back. The ECC may, therefore, detect a false error and problems may result.

Because of these potential problems, it may be necessary to trigger the bus switch 212 through an alternate means. In one embodiment, rather than writing to the on-board SDRAM's memory 210 to trigger a 'Get Bus,' the host 208 writes to memory on another DIMM 204 on the system's memory bus 206, and the FPGA 202 detects this by monitoring the memory bus' 206 address signals, which are shared among the chipset 208, the apparatus 214 (SDRAM 210, bus switch 212 and FPGA 202) and other DIMM's (memory modules) 204. In one embodiment, since chip-select signals 216 are not shared among the various DIMM's 214, 204(generally), the apparatus 214 cannot tell which memory module 204 (or which side of that module) other than itself 214 is being accessed. Also, since the precise usage of the memory bus address lines to select rows, banks, and columns vary from memory module 204 to memory module 204, the apparatus 214 may not be able to tell precisely what offset into a memory module 204 (from the beginning of the reserved 2 KB, explained below) is being accessed. In one embodiment, what may be relied on, is the usage of the 8 least significant bus address lines as the eight least significant column address bits. In one embodiment, with 64-bit data words, the apparatus 214 can tell what physical address is being accessed modulo 2 KB. It can tell, e.g., that an access was to a physical address 2048*N+1224 bytes, for some unknown value N. In one embodiment, the apparatus's 214 information is the offset of 1224 bytes, or 153 64-bit locations. This provides for only 8 bits of information. If the FPGA 202 executes a 'Get Bus' request every time a certain offset into 2 KB (the reserved area of memory) is seen, it may do so at frequent, unintended times, triggered not only by intentional 'Get Bus' commands, but also by unrelated memory accesses by the operating system or software applications. In one embodiment, to minimize such accidental 'Get Bus' switches, the amount of information in the command is increased by writing not just to a single address, but to a sequence of addresses. In one embodiment, by choosing the sequence carefully and to be sufficiently long, it can be made unlikely that the chipset 208 will randomly perform memory accesses matching the sequence.

In one embodiment, it is not necessary to utilize a sequence of address calls for the 'put bus' command. Because the host 208 is connected to the apparatus' SDRAM 210 at the time of a 'put bus' command, there is no problem writing to a single trigger address on the apparatus' SDRAM 210. After such a command, the FPGA 202 switches the bus to itself.

Figure 3A:
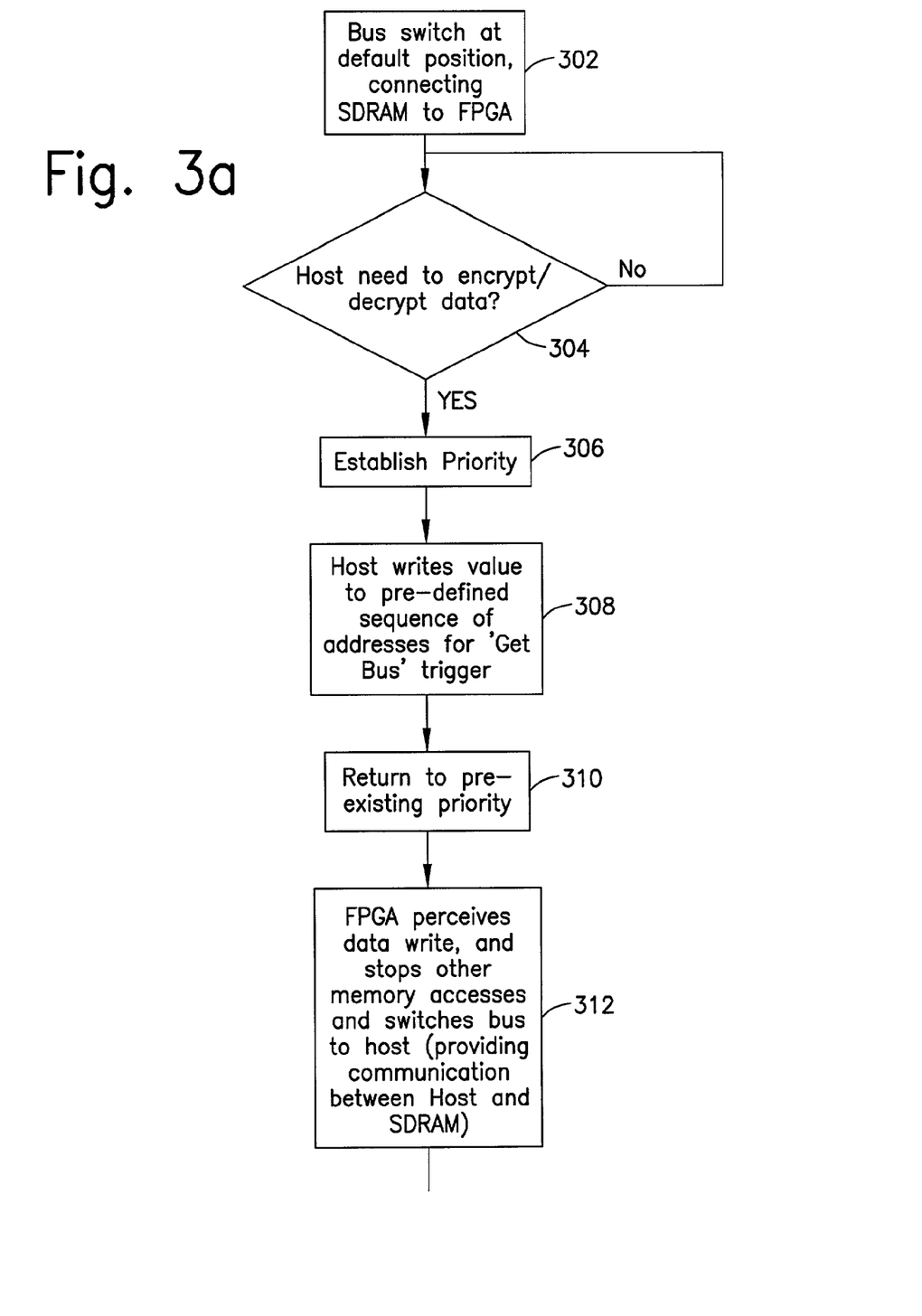
FIG. 3 provides a flowchart representative of the process of bus switching for a dynamic bus peripheral under principles of the present invention.
Figure 3B:
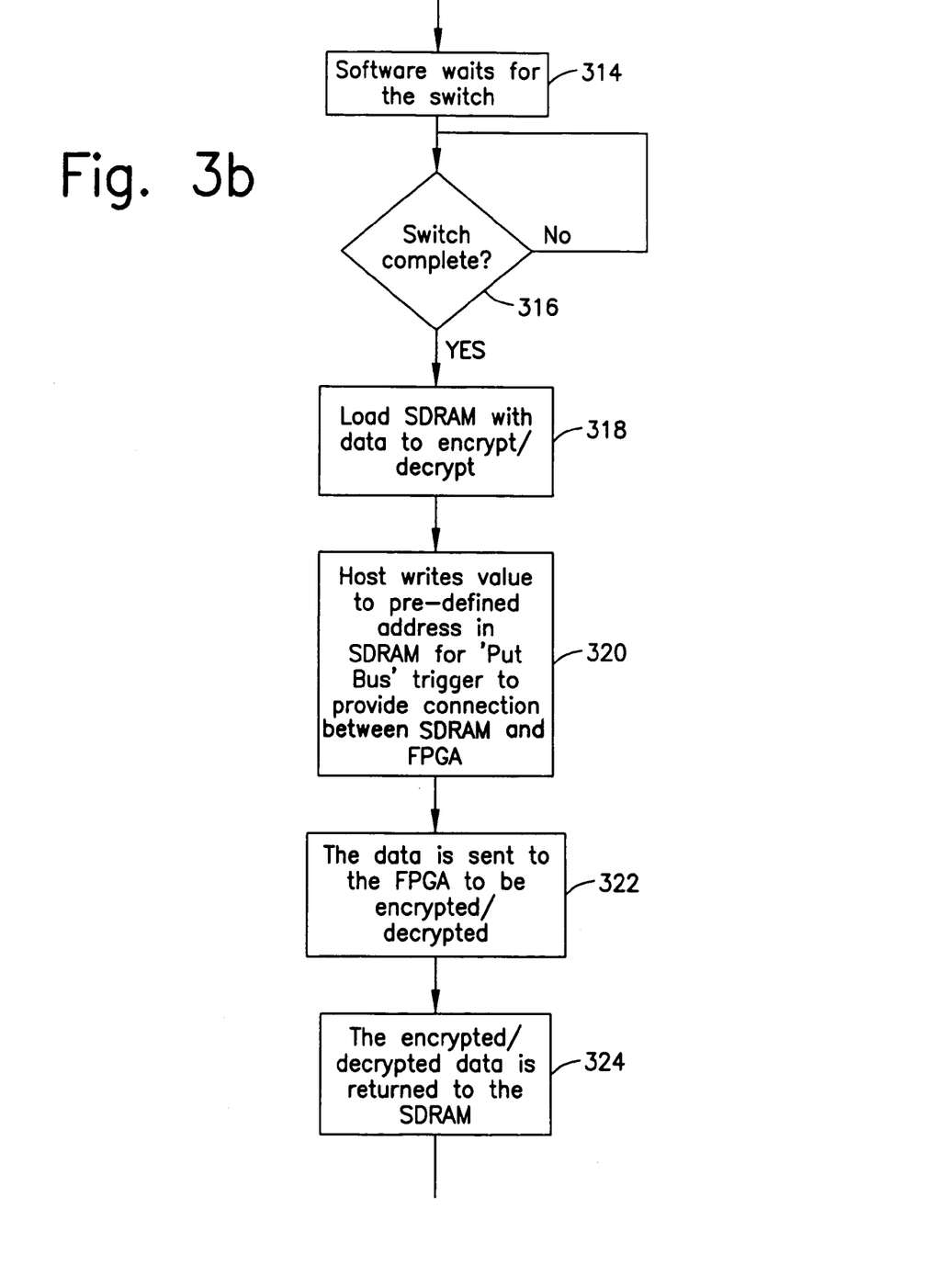
Figure 3C:
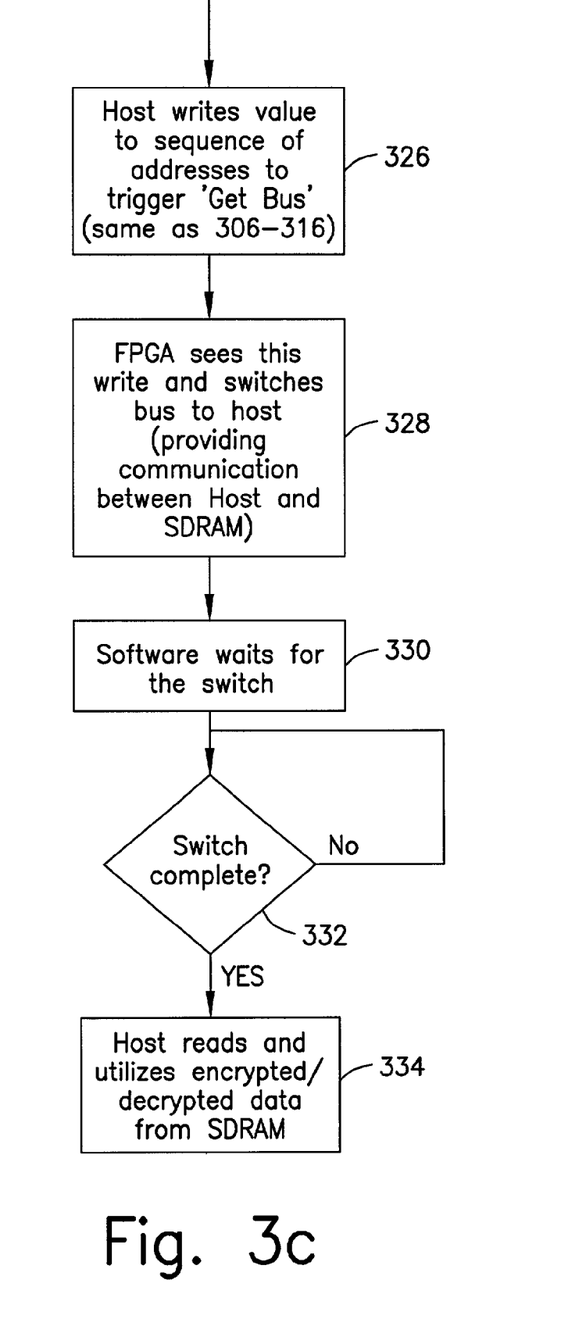

FIG. 3 provides a flowchart representative of the process of bus switching for a dynamic bus peripheral under principles of the present invention. In one embodiment of the present invention, the bus switch is found at the default position 302, which provides communication between the on-board SDRAM and the FPGA. In one embodiment, when the host wants access to the apparatus' memory 304 (for encryption/decryption, etc.), it would 'spin-lock' the system (cause an indefinite loop), disable as many interrupts as possible, and establish as exclusive of access to memory and as uninterruptible an execution priority as possible 306. In one embodiment, the host writes, as rapidly as possible, to a predetermined sequence of addresses in the reserved 2 KB 308. Since the addresses seen by the apparatus are based on 64-bit data words, each address in the sequence is offset by a different multiple of 8 bytes. In one embodiment, a valid sequence of 8 offsets is as follows: 1208, 464, 1736, 1056, 408, 1840, 1256, and 704 bytes. In one embodiment, for the FPGA to detect the 'Get Bus' command sequence, the eight least significant address lines from the system's memory bus are monitored on each appropriate clock edge. In one embodiment, these eight bits are compared to the command sequence values determined by dividing the byte offsets used by the host by eight. For the sequence provided above, these values are 151, 58, 217, 132, 51, 230, 157, and 88. In one embodiment, the portion of the command sequence previously seen is monitored and the switch is made to the host when the whole sequence has been perceived.

In one embodiment, the 'spin-lock' is then removed and the interrupts are once again enabled 310. In one embodiment, the system waits some period of time that allows the FPGA to detect the command sequence 312 and switch 314 the SDRAM bus to the host 316. In one embodiment this time period is about 5 microseconds.

In one embodiment, the on-board SDRAM is next loaded by the host with data to encrypt/decrypt (or for whatever purpose) 318. In one embodiment, the host then makes a predefined sequence of address calls to trigger a 'Put Bus' 320. The data is then forwarded to the FPGA so that the computational activity (such as encryption/decryption) can be performed 322. In one embodiment, after the activity, the encrypted/decrypted, etc. data is returned to the SDRAM to be held 324. The host then triggers a 'Get Bus' by the appropriate sequential address call 326 (same as done previously 306-316). In one embodiment the FPGA perceives this sequential address call and switches the bus to the host 328. In one embodiment, after waiting for the switch to occur 330, 332, the host reads and utilizes the altered (encrypted/decrypted, etc.) data from the SDRAM 334.

Figure 4:
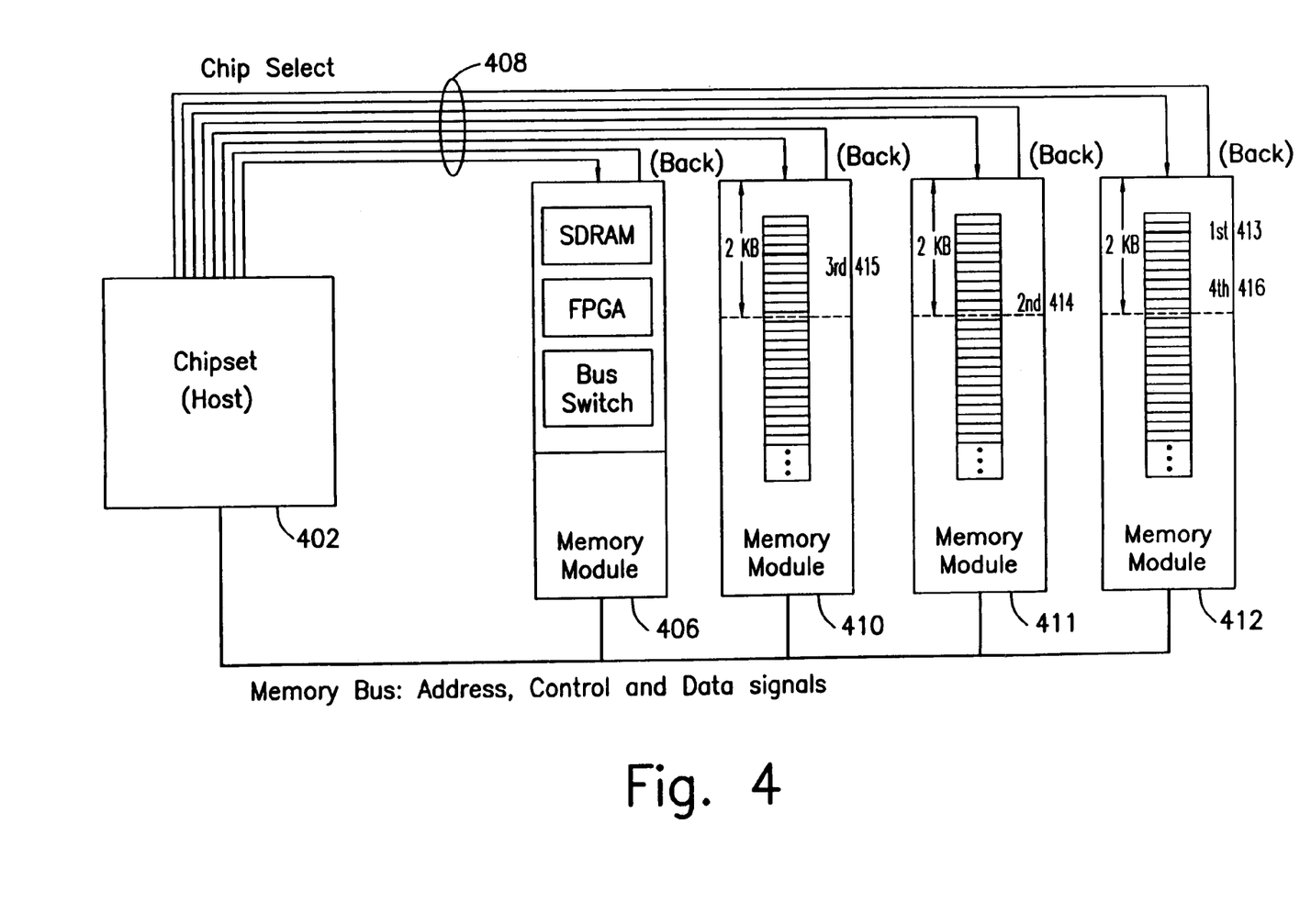
FIG. 4 provides an illustration of example address locations utilized in a sequential address call used for triggering a 'Get Bus' under principles of the present invention.

FIG. 4 provides an illustration of example address locations utilized in a sequential address call used for triggering a 'Get Bus' under principles of the present invention. In one embodiment, the host 402 initiates a 'Get Bus' command by writing to (or reading from) specific predefined memory address locations in a reserved region of off-board memory in a predefined sequence.

In one embodiment, to initiate the system during kernel and driver loading, in software at least 2 KB of memory is reserved (on some DIMM(s) 410, 411, 412 other than the apparatus 406) at a physical location on a 2 KB boundary. In one embodiment, the highest 1 MB is reserved under the apparatus'offset. In one embodiment, next, the reserved region of memory is set as 'uncachable,' so that writes to it will be immediately executed.

In one embodiment, because the apparatus 406 is blind to the chip select 408, it does not know to which DIMM 410, 411, 412 the host's given address is referring. Therefore, in one embodiment, the distinguishing characteristic between address calls is the depth into the reserved region, regardless of to which DIMM 410, 411, 412 the call was intended. As stated previously, it does not matter if the sequence of address calls are to just one DIMM 410, 411, 412 or if they are to multiple DIMMs 410, 411, 412.

In a hypothetical sequence of address calls in one embodiment, a first memory call 413 is made to a specific address in the third DIMM 412. In one embodiment, a second memory call 414 is then is made to a specific memory address in the second DIMM 411, and then a third memory call 415 is made to a specific location in the first DIMM 410. Lastly, in one embodiment, the fourth memory call 416 is made to a specific location in the third DIMM 412. Upon perceiving the complete sequence, the apparatus 406 performs the switch.

As stated previously, in one embodiment, all of the address calls for this sequence could have been directed to the same DIMM 410, 411, 412 without affecting the result. The only difference would be which chip select 408 is enabled. Because the apparatus 406 is blind to the chip selects 408, there would be no change to the result. The same sequence of address calls would cause the 'Get Bus'.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system to initiate, by a host, an event in a first device, the system comprising:
   a signal line to communicate a plurality of values between a host and one or more second devices; and
   a tap line to communicate said plurality of values between said signal line and said first device;
   wherein said event is initiated upon detection, by said first device, of a predetermined sequence of address locations on the tap line,
   and wherein said event selectively switches a communication path from a third device to one of said host and said first device.

2. The system of claim 1, wherein the event comprises a switching from a communication path between the first device and the third device and a communication path between the signal line and the third device.

3. The system of claim 1, wherein the event comprises a switching from a communication path between a signal line and the third device and a communication path between the first device and the third device.

4. The system of claim 1, wherein the host is a processor.

5. The system of claim 1, wherein the first device is a logic device.

6. The system of claim 1, wherein each of the one or more second devices is a memory device.

7. The system of claim 1, wherein the third device is a memory device.

8. The system of claim 1, wherein the host is a microprocessor chipset, the first device is a Field Programmable Gate Array (FPGA), each of the one or more second devices is a Dual In-line Memory Module (DIMM), and the third device is Synchronous Dynamic Random Access Memory (SDRAM).

9. The system of claim 1, wherein each of the plurality of values represents a memory location within any of the one or more second devices.

10. The system of claim 9, wherein utilization of a value provides a call to the represented memory location.

11. A method to initiate, by a host, an event in a first device comprising:
    communicating, by a signal line, a plurality of values between a host and one or more second devices;
    communicating, by a tap line, said plurality of values between said signal line and said first device;
    initiating said event upon detection by said first device of a predetermined sequence of address locations on the tap line; and
    selectively switching a communication path from a third device to one of the host and the first device, in response to said detection.

12. The method of claim 11, wherein the event comprises a switching from a communication path between the first device and the third device and a communication path between the signal line and the third device.

13. The method of claim 11, wherein the event comprises a switching from a communication path between a signal line and the third device and a communication path between the first device and the third device.

14. The method of claim 11, wherein the host is a processor.

15. The method of claim 11, wherein the first device is a logic device.

16. The method of claim 11, wherein each of the one or more second devices is a memory device.

17. The method of claim 11, wherein the third device is a memory device.

18. The method of claim 11, wherein the host is a microprocessor chipset, the first device is a Field Programmable Gate Array (FPGA), each of the one or more second devices is a Dual In-line Memory Module (DIMM), and the third device is Synchronous Dynamic Random Access Memory (SDRAM).

19. The method of claim 11, wherein each of the plurality of values represents a memory location within any of the one or more second devices.

20. The method of claim 19, wherein utilization of a value provides a call to the represented memory location.

21. A set of instructions residing in a storage medium, said set of instructions capable of being executed by a processor to initiate, by a host, an event in a first device comprising:
    communicating, by a signal line, a plurality of values between a host and one or more second devices;
    communicating, by a tap line, said plurality of values between said signal line and said first device;
    initiating said event upon detection by said first device of a predetermined sequence of address locations on the tap line; and
    selectively switching a communication path from a third device to one of the host and the first device, in response to said detection.

22. The set of instructions of claim 21, wherein the event comprises a switching from a communication path between the first device and the third device and a communication path between the signal line and the third device.

23. The set of instructions of claim 21, wherein the event comprises a switching from a communication path between a signal line and the third device and a communication path between the first device and the third device.

24. The set of instructions of claim 21, wherein the host is a processor.

25. The set of instructions of claim 21, wherein the first device is a logic device.

26. The set of instructions of claim 21, wherein each of the one or more second devices is a memory device.

27. The set of instructions of claim 21, wherein the third device is a memory device.

28. The set of instructions of claim 21, wherein the host is a microprocessor chipset, the first device is a Field Programmable Gate Array (FPGA), each of the one or more second devices is a Dual In-line Memory Module (DIMM), and the third device is Synchronous Dynamic Random Access Memory (SDRAM).

29. The set of instructions of claim 21, wherein each of the plurality of values represents a memory location within any of the one or more second devices.

30. The set of instructions of claim 29, wherein utilization of a value provides a call to the represented memory location.

31. A system comprising:
   a first device to execute a variety of computationally intensive tasks;
   a memory bus directly coupled to both a host and one or more second devices, the memory bus to communicate a plurality of data values between the host and said one or more second devices;
   a tap line to communicate said plurality of data values between the memory bus and the first device; and
   a memory device selectively coupled, by a bus switch line, to one of the host and first device, wherein the bus switch line is coupled with the memory device and the bus switch line is selectively switched between the first device and the host in response to an event initiation, wherein the tap line communicatively connects the first device with the host via the memory bus, and wherein a sequence of control signals sent from the host to the first device cause an event initiation, wherein the sequence of control signals comprise a sequence of address locations.

32. The system as recited in claim 31, wherein the one or more second devices comprise memory devices, and wherein the address locations represent memory locations within any of the one or more second devices.

33. The system as recited in claim 31, wherein the first device is a field programmable gate array (FPGA).

34. The system as recited in claim 33, wherein the memory device is a synchronous dynamic random access memory (SDRAM).

35. The system as recited in claim 34, wherein the one or more second devices comprise one or more dual in-line memory modules (DIMMs).

36. The system as recited in claim 31, wherein an event initiation is to be controlled by the host and the selective switching of the bus switch is to be controlled by the first device.

37. A system comprising:
   a first device to execute a variety of computationally intensive tasks;
   a memory bus to communicate a plurality of values between a host and one or more second devices;
   a tap line to communicate said plurality of values between the memory bus and the first device, wherein the tap line communicatively connects the first device with the host via the memory bus, and wherein a sequence of control signals comprising a sequence of address locations is sent from the host to the first device to cause an event initiation; and
   a memory device selectively coupled, by a bus switch line, to one of the host and first device, wherein the bus switch line is coupled with the memory device and the bus switch line is selectively switched between the first device and the host in response to the event initiation.

38. The system as recited in claim 37, wherein the one or more second devices comprise memory devices, and wherein the address locations represent memory locations within any of the one or more second devices.

* * * * *